United States Patent [19]

Panizza

[11] Patent Number: 5,557,424
[45] Date of Patent: Sep. 17, 1996

[54] PROCESS FOR PRODUCING WORKS OF ART ON VIDEOCASSETTE BY COMPUTERIZED SYSTEM OF AUDIOVISUAL CORRELATION

[76] Inventor: Janis M. Panizza, 446 Kenmont Ave., Pittsburgh, Pa. 15228

[21] Appl. No.: 392,194

[22] Filed: Sep. 15, 1995

Related U.S. Application Data

[63] Continuation of Ser. No. 121,669, Sep. 15, 1993, abandoned, which is a continuation of Ser. No. 698,855, May 13, 1991, abandoned, which is a continuation-in-part of Ser. No. 236,740, Aug. 26, 1988, abandoned.

[51] Int. Cl.⁶ ............................... H04N 5/76; A63J 17/00
[52] U.S. Cl. ......................................... 358/335; 84/464 R
[58] Field of Search ...................................... 358/310, 335, 358/341, 342, 343, 906, 311; 360/19.1; 84/464 R, 470 R, 477 R, 478; 381/1, 12, 17; H04N 5/76, 5/92, 5/91

[56] References Cited

U.S. PATENT DOCUMENTS

| | | | |
|---|---|---|---|
| 3,924,267 | 12/1975 | Holt | 360/9 |
| 3,928,717 | 12/1975 | Dorland | 84/464 R |
| 4,056,805 | 11/1977 | Brady | 84/464 R |
| 4,262,338 | 4/1981 | Gaudio Jr. | 84/464 R |
| 4,378,466 | 3/1983 | Esser | 84/464 R |
| 4,392,408 | 7/1983 | Suzuki | 84/464 R |
| 4,622,881 | 11/1986 | Rand | 84/464 R |
| 4,652,944 | 3/1987 | Tindall | 360/33.1 |
| 4,753,148 | 6/1988 | Johnson | 84/464 R |
| 4,779,510 | 10/1988 | Van den Abbeel | 84/464 R |
| 4,864,425 | 9/1989 | Blazek et al. | 358/335 |
| 4,868,687 | 9/1989 | Penn et al. | 360/13 |
| 4,961,116 | 10/1990 | Kanamaru et al. | 358/343 |
| 5,003,526 | 3/1991 | Bailey | 358/342 |
| 5,005,459 | 4/1991 | Adachi et al. | 84/478 |
| 5,286,908 | 2/1994 | Jungleib | 84/478 |

FOREIGN PATENT DOCUMENTS

| | | | |
|---|---|---|---|
| 242130A | 10/1987 | European Pat. Off. | 358/311 |

*Primary Examiner*—Thai Q. Tran

[57] ABSTRACT

In a system for combining internally generated visual patterns and sound patterns and recording them on videocassettes and videotapes, sound is introduced into a computer as either audio signals (analog) or digitized (MIDI) signals. Through a digital microphone connected by cable to a digital signal processing port of the computer. The signals are automatically transformed into a digital data stream that is compatible with the computer. Visual images are drawn on the computer monitor and saved, then synchronized to sound signals by a custom program that breaks the sound signals into control components representative of frequency, loudness, or peak of pulse of the sound, which causes the visuals to respond by moving in specified ways. The components control the speed, brightness and rhythm of motion of the visual patterns. From the computer, the visual information signals are converted to a recordable scan rate by inputting through a scan converter connected by cable to the video input jack of a VCR for recording. The sound is brought into the audio input jack of the VCR from the source by attached cable. The VCR is attached to a second VCR to record a videotape. The second VCR may be attached to a TV to view and hear the videotape. To project rather than record, the cables may be attached to a large screen monitor.

17 Claims, 4 Drawing Sheets

PROCESS FOR PRODUCING WORKS OF ART ON VIDEOCASSETTE BY COMPUTERIZED SYSTEM OF AUDIOVISUAL CORRELATION

This is a continuation application of application Ser. No. 121,669, filed Sep. 15, 1993, now abandoned, which was a continuation application of application Ser. No. 07/698,855, filed May 13, 1991, now abandoned, which was a complete continuation-in-part application of my patent application Ser. No. 236,740, filed Aug. 26, 1988, now abandoned.

BACKGROUND OF THE INVENTION

While the technology exists, videocassettes have not been heretofore produced in this way showing primarily lights in motion correlated to sound as a fine art medium or as a form of entertainment, i.e; this invention uses standard hardware components assembled in a particular manner for this purpose.

SUMMARY OF THE INVENTION

An object of the present invention is to produce a videocassette with sound. This may be done on a computerized system by providing different designs of lights and superimposing them in spaced relationship and thereafter varying their light intensities differently and at the same time correlating such light intensities with sound to produce an overall visual and sound effect.

One further object of this invention is to provide the means by which a visual artist can generate designs and patterns that are to be correlated to sound, with a degree of complexity and sophistication to be of interest in a line art context, and to control their orchestration to sound. With designs and patterns generated on computer, the appropriate hardware may be attached to mix the visual art with sound, and the visual art programmed to respond to the sound.

DETAILED DESCRIPTION OF A PREFERRED EMBODIMENT

The present invention comprises an audiovisual presentation of light juxtaposed in an overall linear design electronically controlled to respond to music or sound and to be in constant motion in a systematic fashion.

The way this invention is implemented requires first the development of precise visual elements or patterns to correspond with precise musical elements. The development of the design can be greatly computer aided. The designs are to be generated on a computer screen. The designs described here appear on the computer screen as abstract patterns of light. Any visual style may be accommodated by this system. The computer technology is available that can translate the music being played into its visual equivalent and conversely can translate the visual design into its exact musical equivalent. These visual elements thus generated, on the computer, will then be evaluated, edited and refined by the artist into a final form of new linear design elements such as those shown in FIGS. 1, 2 and 3, which are in accordance with the style of the artist, for aesthetic reasons.

Figure 1:
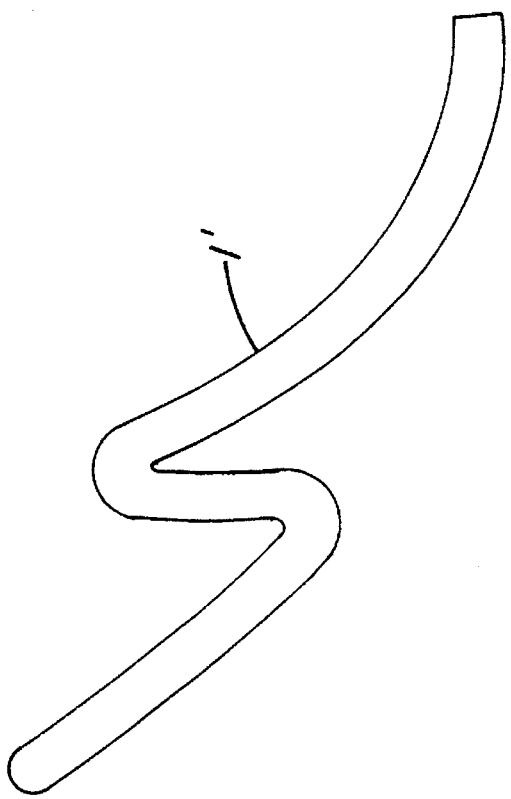
FIG. 1 is a front view of a first linear light design.
Figure 4:
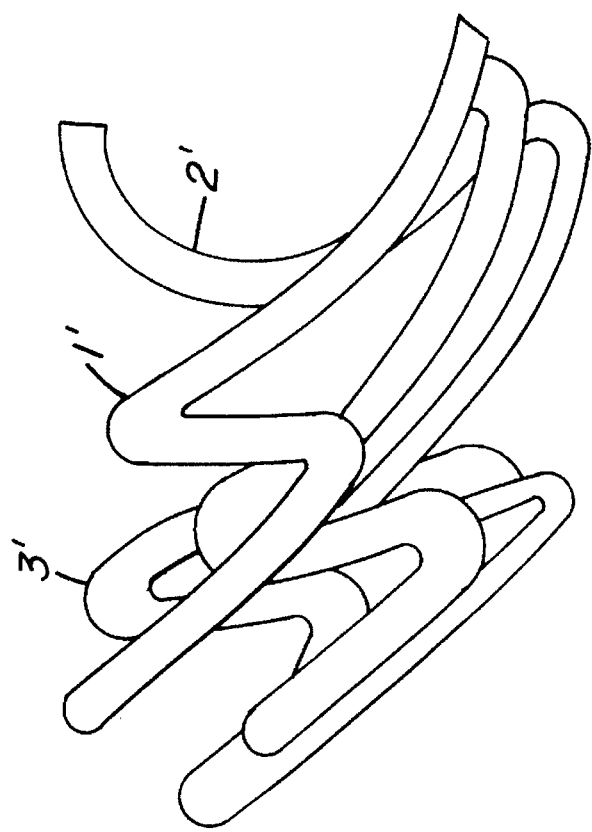
FIG. 4 is a front view of a superimposed light design of FIGS. 1, 2 and 3.

Referring to FIG. 4, in the next step, the separate units of light are then superimposed on the computer screen in non-aligned positions to form a composition. More specifically, the pattern in FIG. 1 is superimposed on the pattern 2 of FIG. 2 and the pattern 3 of FIG. 3 so as to provide a resulting combined, superimposed arrangement of light patterns as illustrated in FIG. 4.

Figure 2:
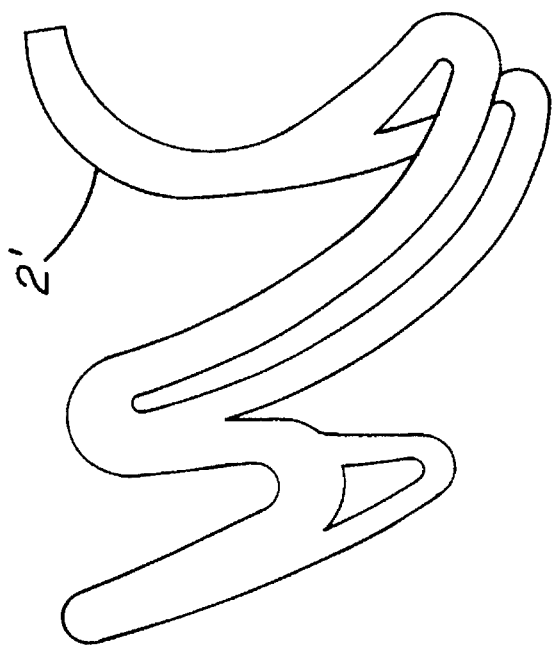
FIG. 2 is a front view of a second linear light design.
Figure 3:
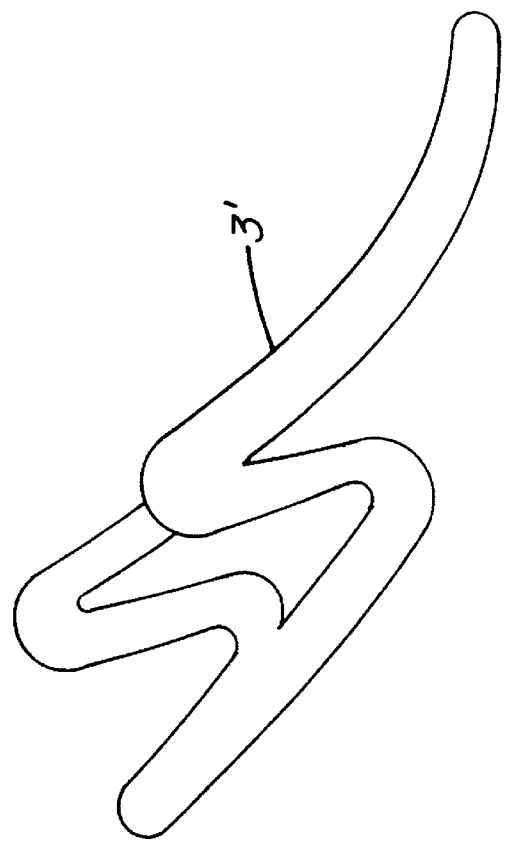
FIG. 3 is a front view of a third linear light design.
Figure 5:
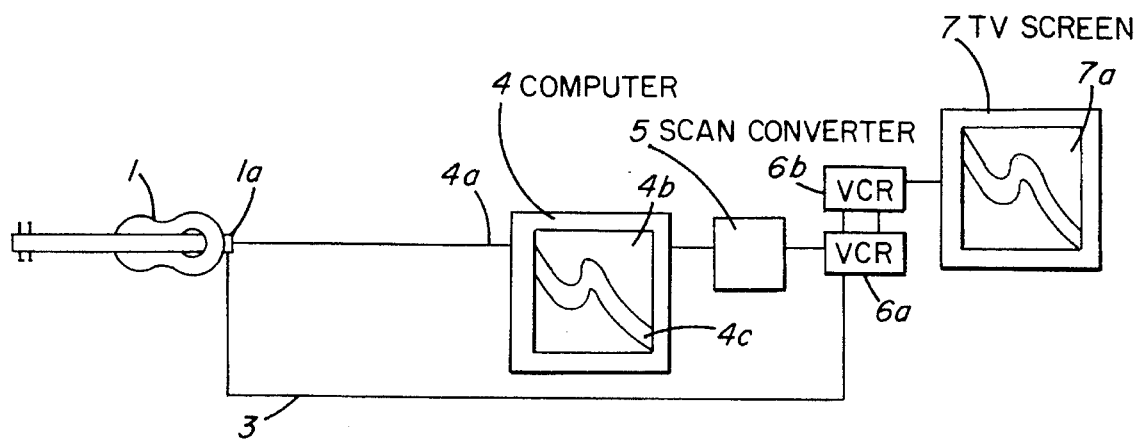
FIG. 5 is a simplified block diagram showing the basic arrangements of components using MIDI (Musical instrument digital interlace) signals as a sound source.
Figure 6:
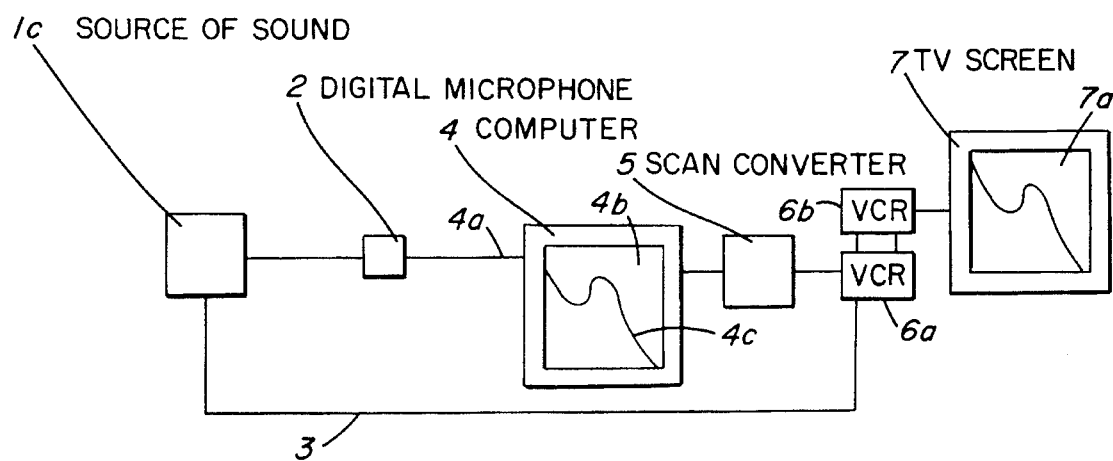
FIG. 6 is a simplified block diagram showing the basic arrangement of components using audio signals as the sound source.
Figure 7:
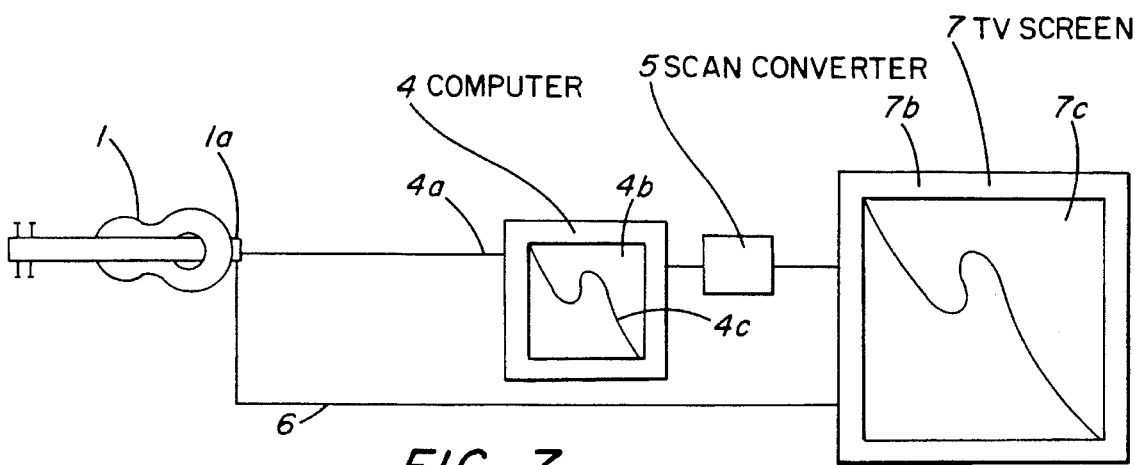
FIG. 7 is a simplified block diagram showing a modification of the system wherein the contents are to be projected rather than recorded.

Each of these separate light elements is electronically controlled to respond separately to different assigned aspects of the music, by computer program. The sound signals are brought in to the computer by the arrangement of hardware components as shown in FIGS. 5 or 6, then programmed to cause the visual elements to respond accordingly. The system allows for the choice of sound from a variety of sources by providing for the use of either a digital microphone for audio sound signals such as from a voice, record, tape, CD, or laserdisc, or a digital interlace device for digitized signals; as from a musical instrument such as guitar or synthesizer with a MIDI (Musical Instrument Digital Interface) interface attached. (Refer to FIGS. 5 and 6.), along with the appropriate programming. These signals are imported through the digital signal pod of a computer, as shown in FIG. 5, where the incoming sound signals in either form are translated into digital data which is compatible with the computer. A certain type of computer is used having the capacity for digital signal processing, with a digital signal processing (dsp) port through which to bring in the sound signals automatically translating them into a digital data stream compatible with the computer. (The dsp port is standard on the commercially available NeXT computer made by NeXT, Inc.) These signals are to cause the visual elements to move in response in specified ways. At the same time, visual elements generated on a computer screen are capable of being saved on disc by the computer. Once on the computer, the visual ad may then be manipulated in response to sound signals from an outside source, and these manipulations may be saved as well, so that a catalog of images and of the manipulations done is created for future use, for example to be sampled into new compositions, or for reference. Each of these visual elements is to be made to correspond to a different pad or aspect of the music by computer program. The custom programming listens to the sound signals (music analyzation) and breaks them into control components such as frequency, loudness or peak of pulse of the sound. The music analyzation creates the components or performance events on the computer that generate and control visual presentation. The control components or performance events, then act as a trigger for a response in the visuals patterns in a specified way, such as by a change of color or lintensity, size, shape or a specific movement. The exact response is not locked in. The program allows the artist to select what response he chooses in a particular composition. For example the program takes a chosen signal, such as a drumbeat, and in one instance, it may be desired to have the visual element correspond to the drumbeat by changing color or intensity, while in another instance it will respond with a particular motion. At the same time, another visual element may be responding to another aspect of the sound on a different channel by a different type of response. The performance events are a carefully defined set of events in the program, such as the drumbeat, that form a communications channel between the music analyzation and the graphics and animation section. The artist controls these responses by using the mouse and keyboard of the computer. The program consists of the music analyzation section, a graphics processor and animation generator, a graphics and animation description file and at least three editors. The program is in two packages, a performance package and an editing package. Both have the capacity to deal with MIDI input and digitized audio input. The performance package uses only prerecorded responses from the description files. It does not use the editors. It's use is for a live performance of music as shown in FIG. 7. The editing package is an application that allows the artist to define the visuals, to animate, and to control how the visuals react to the music. The program is defined in two packages with the intent to modularize the whole package in order to allow for expansion in the future of each section. (Refer to the flow chart, FIG. 8.) Each of these visual elements can be arbitrarily assigned to different parts of the musical harmony, just as the soprano parts, alto and bass are assigned to voices of a choir, or to different instruments such as piano, violin, and flute, of an ensemble. For example, FIG. 1 would respond to the soprano aspect only. FIG. 2 would respond to the tenor aspect of the music only. FIG. 3 would respond to the bass aspect only. The way these respond that correlates with the music would be volume equivalent to intensity, on-off frequency equivalent to rhythm and speed of the music. Each will be assigned to this different aspect of the music, only by computer. In other words, each element is programmed to function as the exact visual equivalent of the sound and/or the music to function as the exact equivalent of the visual design. One example of this is to have as many different neon lights or other types of lights as there are notes in music including sharps and flats. In such case the light and sound can be coordinated and the duration of the light representing any note will indicate whether it is a full note, half, or quarter. Thus by looking at the array of lights representing different notes, a visual image will be given of any particular piece of music being played and the sound will correspond to that of a particular note represented by the illuminated lamp or light. For example, the sounds of a C note will be synchronized with the corresponding light which gives a visual indication of the letter C as well as an aural indication, thereof. Instead of shaping the lights in the form of curves they can be arranged in horizontal parallel relationship just as a staff in a sheet of music and intermediate sharps and flats also arranged therebetween. Thus a musician in looking at the lighting of the various staffs and intermediates and notes will have a visual indication of the particular song being played as well as hearing that particular song.

The video signals from the computer have to be converted from the fast scan rate of the computer to the slower recordable scan rate, so a scan converter is operatively connected to the computer (as shown in FIG. 7), to process the signals. The signals from the scan converter may then be either recorded on a VCR or projected on a compatible monitor. Or, if in the future a computer is designed to have this capacity, the outputs may be directly connected to the VCRs or projectors without needing a scan converter.

There are several applications of this invention, depending on its intended use. Depending on whether it is to be recorded or projected, the information from the scan converter is alternatively attached to either the two VCR's in the first case, or to a monitor in the second case, as illustrated in FIG. 7. The first tape produced is to be used as a master tape from which videocassettes can be commercially reproduced. The videocassette is meant to be made available on the current market, as a published work of art. Home videocassettes are to be made available to the public as a form of high entertainment. It will raise the level of contemporary entertainment a esthetically and is to be played on the home videocassette player. It is, as well, the first use of the videocassette in this way, as a fine art medium. Where the intent is to produce a videocassette, the components are arranged as shown in FIGS. 5 and 6, to record. If the videocassette is to be recorded, two VCR's are to be operatively arranged to the scan converter box, with the original sound brought around from the source by an operatively arranged cable, bypassing the computer. This first videocassette then may serve as the master tape for mass production at a commercial production studio, or this same tape may be mass produced as a laserdisc.

In the second application it serves as an installation, for a specific site, such as in a lobby in a building, for visual observation. The videotape can be shown on a video monitor or series of monitors installed on the site. The video monitors would show the light patterns in constant motion to music on screens strategically placed around the lobby's interior. If this is the intent, the cables from the scan converter and the source of sound are attached to a video monitor, as shown in FIG. 7. The source of sound may be the sound at the site, such as crowd noises of people walking and talking through the site and such sound source can be utilized by using the audio setup shown in FIG. 5, with a digital microphone used to take in the audio signals there, producing a display of visual imagery in constant motion In response to the source at the site. In this case the computer is programmed in any way desired for the specific circumstance, such as to have the brightness of color respond to volume, etc. Or, sensors may even be attached to the system to use other stimuli than sound, such as weather or room lighting, where the visual art would respond to these instead of to sound.

In the third application, also as an installation, the patterns developed on the computer could be translated into a neon light to be with each separate section of tubing arranged in a superimposed relationship in non-aligned positions which are each separately electronically controlled by computer to respond to different aspects of the music in the same way as in the previous example.

In all of these, the same or similar visual composition may be used. All of these are electronically controlled or computer programmed to be in synchronization with the music. Such synchronization is done by digital computer to provide digitized music patterns synchronized with computer generated digitized color patterns, and designed to accommodate music and sounds from any source including records, tapes, CD's, laserdisc or synthesizer, or live performances.

As an installation of composed neon light tubing, the present invention may take the form of superimposing separate units of lights of different shapes to provide an overall combined design. More specifically, the somewhat S shape of neon tube 1 shown in FIG. 1 is superimposed on tube 2 of FIG. 2 and tube 3 of FIG. 3 so as to provide a resulting combined superimposed arrangement of tubing illustrated in FIG. 4.

Tubes 1, 2 and 3 have different internal compositions so that they will be of different colors. Tubes 1, 2 and 3 are electrically interconnected. Instead, they are each connected to a computer programmed to respond to a different component of recorded music. For example, the intensity of the light may be in accordance with the volume of the sound.

In any or all of the three applications, the overall effect of the lighting arrangement would be dependent on the "mood" of the music, one of a very active, colorful, complex, quickly dancing light patterns, or one of a serene, low luminosity, slowly moving, quiet and graceful lighting, as a response to the music, or some combination of these effects. The synchronization would be programmed accordingly at the time.

Different music can be programmed at will at any time, and the visual ad would respond accordingly. It can be just as easily correlated to a symphony as to a current pop tune or any sounds available. The artist will make these choices for the most harmonious and beautiful effects.

In addition, other sounds can be used to augment the primary music; for example, the sounds of birds, the songs of whales, and other natural or manmade sounds. In the same way other visuals can be used, by being scanned in to the computer, such as the night sky with stars, for a brief sequence as a minor function of the videotape. This is not a dominant aspect, but is to be used for the purpose of adding resonance, contrast, and richness to the primary themes.

The system consisting of the complete assemblage of components may be made available as a unit to be utilized by recording studios to complement the work of musicians, to produce visual correlations to the music, and to be published. The music may also be recorded and produced as a 5 inch compact disc, to accompany the videocassette, or the master videocassette may be commercially published as a laserdisc. A series of videocassettes may be produced based on the same style and concept set forth in this statement.

Another application is for musicians to use as an aid to composing, reading, and translating music into sheet music, with the visual elements representing the notes and staff corresponding to sheet music so that as the music is played it can be seen on the computer monitor as sheet music, and also saved on a disc inserted in the computer, to be printed out from the computer as sheet music.

Yet another application is for companies having to manage large amounts of data, where digital data corresponds to the sound input in to the computer, and with the visual elements responding to certain changes in the data with changes such as color changes, so that changes may be more easily monitored.

FIGS. 5 through 7 show the arrangement of the system to be employed;

FIG. 5 is a simplified diagram showing the basic arrangement of components for using MIDI (Musical Instrument Digital Interlace) signals as the source of sound. Numeral 1 denotes a source of sound as being a musical instrument, such as a guitar or synthesizer, having attached thereto a MIDI interlace device, numeral 1a, which converts the MIDI signals from the instrument into digital data that is to be processed by 4 the computer, and is connected to 4a the digital signal port of the computer, 4c, Images are generated on 4b the computer screen and synchronized to the sound signals. The output goes through the scan converter 5, which converts the video signals from the fast scan rate of the computer to a recordable scan rate for a TV screen 7, or to project as shown in FIG. 7) Two standard VCR's are operatively attached so that the first 6a, receive video input from the scan converter and audio input from the original source of sound, and the second, 6b, records the tape. 7, a TV then shows the contents 7a of the videotape. Numeral 3 shows a connection whereby the sound from the source is brought around the system directly into 6a the first VCR.

FIG. 6 shows the system in FIG. 5 modified to use audio sound signals as the source of sound. Numeral 1c denotes a source of sound as being audio signals (from a prerecorded source such as tape, c.d., or record, or live, such as voice) which is connected to 2 a digital microphone which converts audio sound waves into digital data to be processed by 4 the computer and is connected to 4a the digital signal port of 4 the computer. Visual art in the form of patterns, such as those shown in FIGS. 1–3, are drawn on 4b the computer screen and synchronized to the sound signals by means of programming. Numeral 5 shows the scan converter as in FIG. 5) with 6a and 6b the two VCR's, and the TV arranged the same as in FIG. 5. Numeral 3 shows a connection whereby the sound from the source is brought directly into 6a the first VCR.

FIG. 7 shows a modification of the system in which the contents are to be projected, rather than recorded. The VCR's are omitted and the scan converter is attached to a compatible monitor or a big screen to show in a live performance. Numeral one shows the sound source, (which may be in the form of either audio or MIDI signals, as in either FIGS. 5 or 6.) as being an instrument attached to 1a a MIDI interlace, the attached to 4a the digital signal port of 4 the computer, with the visual input introduced in the same manner as shown in FIGS. 5 and 6 and attached to the scan converter, numeral 5, which is then attached to 7b the monitor. Numeral 3 shows the sound from 1 the source brought around the system and directly into speakers on 7b the monitor, with the monitor screen 7c showing the display of correlated visual art and sound.

Figure 8:
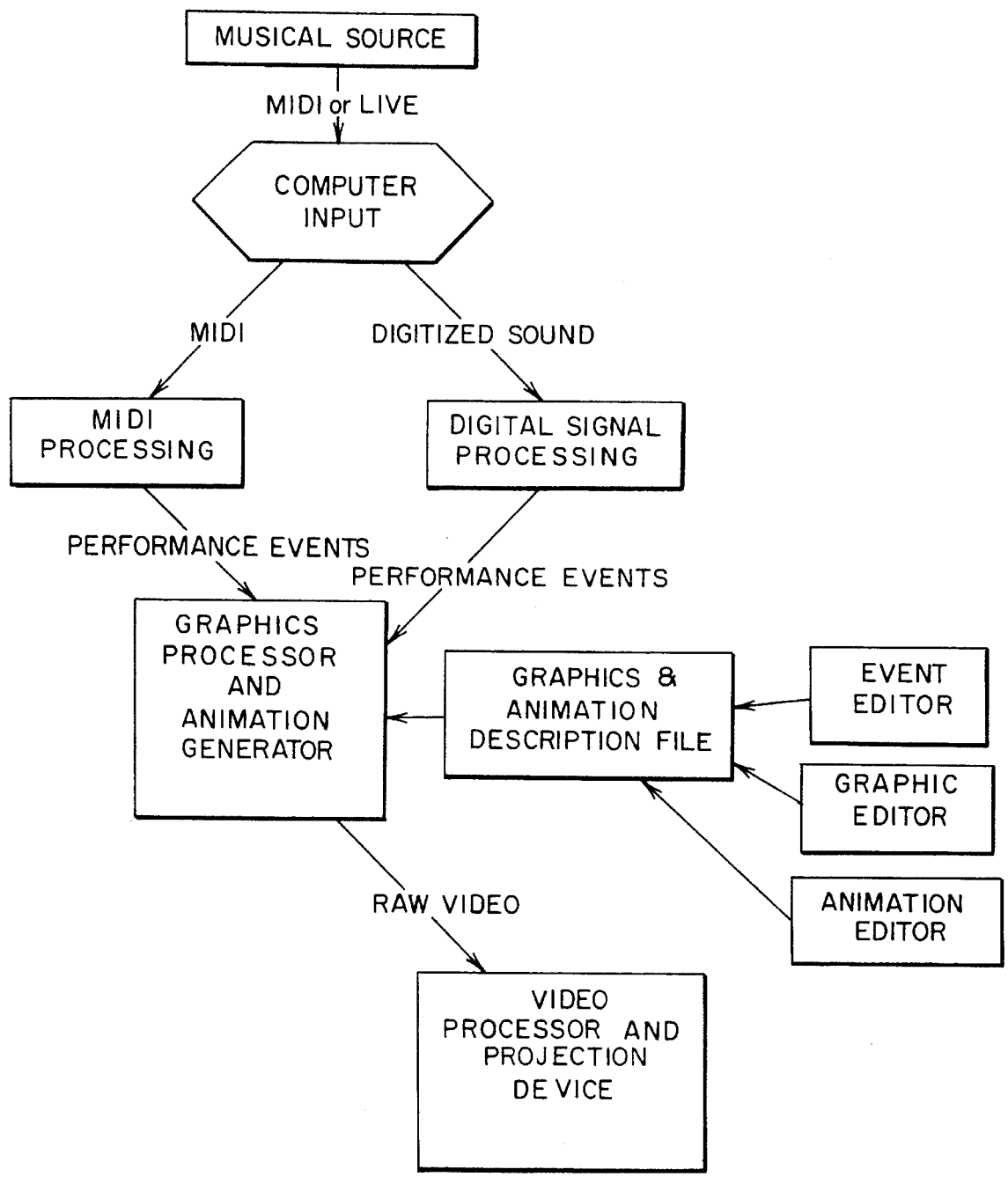
FIG. 8 is a flow chart.

Referring to FIG. 8, flow chart, showing a musical source: either MIDI signals, or audio signals from live sound or prerecorded sources.

Computer Input: if MIDI Is used, then the computer Input is a MIDI interlace for the computer. (A commonly available piece of hardware that costs less than $200.00.) If audio such as live sound is used, an audio digitizer, (a digital microphone) is needed. An alternative to the simple digital microphone is a multiple channel audio digitizer such as the Dazzl A/D board, which will allow the performance events in the program to be generated from multiple channels of sound, as in alive sound board situation, with each instrument being assigned a different channel.

MIDI processing: The music analyzation section of programming that breaks the MIDI code into the performance events.

Digital signal processing: This section breaks apart the sound signal into components and generates performance events from the result.

Graphics processor and animation generator: This unit of the programming ties the performance events to the various visuals and animations that the artist describes, using sections 6 and 7.

Graphics and animation description file: A description file is used here to allow the system to be in two packages, a performance package and a production or editing package. The performance package won't use sections 7a through 7c; it will only perform from these prerecorded description files. The production package contains all sections and allows editing of description files to create new performances.

The editors: This section gives the artist a means to allow editing of the performance in the graphics and animations file. There are at least three divisions to this section;

Event editor; This section allows the artist to edit which animations or sequence of animations are tied to which performance events.

Graphic editor; This section allows the artist to manipulate base graphic objects or pattern elements, such as by rotating or positioning them.

Animation editor: This editor is responsibel for such things as specifying fade-in/out of visuals, movement of visuals, as whether or not visual elements leave trails, or color changes. Video output: sent from the computer to the VCR or monitors.

While I have illustrated and described a single specific embodiment of my invention, it will be understood that this is by way of illustration only and that various changes and modifications may be contemplated in my invention within the scope of the following claims.

I claim:

1. A system for converting audio signals to a visual representation of the audio signals comprising;

a source of audio sound waves, means for converting said audio sound waves into digitized sound waves or computer means being programmed to store a plurality of visual images corresponding to a plurality of digitized input signals representative of audio signals, means for storing in said computer means said digitized input signals and analyzing said digitized input signals into control components to generate visual output signals corresponding to said control components, said control components forming a communication channel between said digitized input signals and said visual output signals trigger the generation of related visual output signals broken down into control components including frequency and loudness or peak of pulse of the sound, said computer means includes programmable control means for selectively changing said visual output signals corresponding to said control component, so that while the responsive output signals remain synchronized with said digitized input signals said visual output signals generated from said control components are edited to change the content of the visual images produced by said output signals including a change of color, size, shape, or movement, said programmable control means including digitized signal processing means for breaking down said digitized input signal into components and generating performance events therefrom and graphics processor and animation generator means for tying the performance events to said visual output signals, means for editing said visual output signals in response to the visual images stored in said computer means and said digitized input signals to generate resultant video output signals corresponding to a range of different visual images from said computer means, said editing means including an event editor to allow selection of the performance events as expressed in graphics or animation, a graphic editor to allow manipulation of the graphics as a representation of the performance events, and an animation editor to allow fade-in and fade-out of a visual display, movement of a visual display and color changes of a visual display, means for receiving said video output signals from said computer means to convert said video output signals having a high scan rate to recordable video signals having a slower scan rate, display means for converting said recordable video signals to a visual display responsive to said digitized input signals, and means for transmitting said audio sound waves from said sound source to said display means for simultaneously broadcasting said audio sound waves with transmission of said visual display.

2. A system as set forth in claim 1 in which, said computer means includes computer program means for analyzing said digitized input signals into control components including frequency, loudness, and peak of pulse of sound, and said control components triggering a plurality of responsive visual output signals representative of said control components.

3. A system as set forth in claim 2 in which, said control components form a communications channel between said digitized input signals and said visual images stored in said computer means.

4. A system as set forth in claim 2 in which, said computer program means includes a music analyzation section, a graphics processor and animation generator, a graphics and animation description file, and an editing section.

5. A system as set forth in claim 4 in which, said editing section matches said digitized input signals with corresponding visual images stored in said computer means whereby said video output signals generate said visual display including images representative of said digitized input signals.

6. A system as set forth in claim 5 in which, said visual display is a visual indication of the audio sound waves from said source, and said display means generating said visual display simultaneously with broadcasting the audio sound waves.

7. A system as set forth in claim 1 in which, said display means includes a scan converter for converting said video output signals at the high scan rate to the lower scan rate, and said video output signals connected to the slower scan rate being processed for subsequent video display.

8. A system as set forth in claim 7 which includes, a first videocassette recorder connected to said scan converter and said source of audio sound waves, and a second videocassette recorder connected to said first videocassette recorder for recording said video output signals at a slower scan rate and the corresponding audio sound waves.

9. A system as set forth in claim 7 in which, said display means includes a video monitor connected to said scan converter to receive said video output signals at a slower scan rate and to said source of audio sound waves, and said video monitor generating a preselected display of video images having a content including graphics, animation, and color determined by said audio sound waves with said audio sound waves broadcast simultaneously with display of said video images.

10. A method for converting audio signals to a visual representation of the audio signals comprising the steps of:

generating sound waves, converting the sound waves to digitized signals representative of the sound waves, storing in the memory of a computer a plurality of visual images corresponding to a plurality of digitized input signals, breaking down the digitized input signals into control components including frequency and loudness or peak of pulse of the sound, triggering the generation of selected visual output signals in response to the control components and forming a communication channel between the digitized input signals and the visual output signals, breaking down the digitized input signal into components and generating performance events therefrom and tying together the performance events to the visual output signals, editing the visual output signals in response to the visual images stored in the memory of the computer and the digitized input signals to generate resultant video output signals from the computer, selecting the performance events as expressed in graphics or animation and allowing manipulation of the graphics as a representation of the performance events, fading in and fading out of a visual display, moving the visual display, and changing color of a visual display, converting the video output signals having a high scan rate from the computer to recordable video signals having a slower scan rate, generating a video display based on the recordable video signals representative of the sound waves, and simultaneously broadcasting the sound waves with display of the video signals.

11. A method as set forth in claim 10 which includes, separating the digitized signals into components representing a plurality of performance events, storing in the memory of the computer data representative of graphics and animation with the digitized signals separated in performance events.

12. A method as set forth in claim 11 which includes, editing the visual output signals in response to the visual images stored in the memory of the computer to generate a preselected video display of graphics and animation based on the performance events.

13. A method as set forth in claim 12 which includes, selecting the graphics and animation stored in the computer for matching with the performance events.

14. A method as set forth in claim 12 which includes, manipulating the graphics and animation to obtain a desired pattern of visual output signals synchronized with broadcasting of the sound waves.

15. A method as set forth in claim 10 which includes, recording for broadcast of sound waves with display of the video signals on a videocassette recorder.

16. A system as set forth in claim 7 in which, said video output signals are recorded on a laserdisc for video display.

17. A method as set forth in claim 10 which includes, recording the video signals on laserdisc for video display.

* * * * *